United States Patent
Yu et al.

(10) Patent No.: US 12,380,176 B2
(45) Date of Patent: Aug. 5, 2025

(54) DYNAMIC MAXIMAL CLIQUE ENUMERATION DEVICE AND METHOD BASED ON FPGA WITH HBM

(71) Applicant: ZHEJIANG LAB, Hangzhou (CN)

(72) Inventors: Ting Yu, Hangzhou (CN); Dong Li, Hangzhou (CN); Yu Zhang, Hangzhou (CN); Hao Qi, Hangzhou (CN); Ting Jiang, Hangzhou (CN); Zenghui Xu, Hangzhou (CN); Linlin Hou, Hangzhou (CN); Jin Zhao, Hangzhou (CN); Ji Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/833,896

(22) PCT Filed: Nov. 28, 2023

(86) PCT No.: PCT/CN2023/134667
§ 371 (c)(1),
(2) Date: Jul. 27, 2024

(87) PCT Pub. No.: WO2025/097510
PCT Pub. Date: May 15, 2025

(65) Prior Publication Data
US 2025/0148041 A1    May 8, 2025

(51) Int. Cl.
*G06F 17/11*    (2006.01)
*G06F 16/901*    (2019.01)

(52) U.S. Cl.
CPC .......... *G06F 17/11* (2013.01); *G06F 16/9024* (2019.01)

(58) Field of Classification Search
CPC .......... G06N 20/00; G06N 3/063; G06N 3/08; G06N 5/01; G06F 16/9024; G06F 17/11
See application file for complete search history.

(56) References Cited

U.S. PATENT DOCUMENTS 10,055,510 B2 *    8/2018    Atasu .................. G06F 16/9024
2023/0095535 A1    3/2023    Maiyuran et al.

FOREIGN PATENT DOCUMENTS

CN    111104224        5/2020
CN    114357264 A *    4/2022
(Continued)

OTHER PUBLICATIONS

R. Kuramochi and H. Nakahara, "An FPGA-Based Low-Latency Accelerator for Randomly Wired Neural Networks," 2020 30th International Conference on Field-Programmable Logic and Applications (FPL), Gothenburg, Sweden, 2020, pp. 298-303 (Year: 2020).*

(Continued)

*Primary Examiner* — Matthew D Sandifer
(74) *Attorney, Agent, or Firm* — Jiwen Chen; Joywin IP Law PLLC

(57) ABSTRACT

Disclosed in the present invention are a dynamic maximal clique enumeration device and method based on an FPGA with an HBM, the method including: the HBM stores a dynamic edge flow, a complete graph adjacency matrix, and candidate cliques; a matrix computing unit updates the complete graph adjacency matrix based on the dynamic edge flow, transmits the updated complete graph adjacency matrix to the HBM for storage, and determines header nodes, of which the corresponding candidate clique needs to be updated; a sequence computing unit constructs, according to the updated complete graph adjacency matrix and each header node to be updated, the sorted data set for reconstructing candidate cliques by data block sequencing; and an update computing unit executes, in parallel, an update task of the candidate clique corresponding to each header node to be updated based on the sorted data set, transmits the updated candidate cliques to the HBM for storage, and transmits the updated candidate cliques to the PC host to (Continued)

extract maximal cliques by means of a filtering operation. The present invention supports the computation of pipelined-type incremental maximal clique, thereby improving the overall computing efficiency of the task.

10 Claims, 4 Drawing Sheets

(56) References Cited

FOREIGN PATENT DOCUMENTS

| CN | 115935080 | 4/2023 |
|----|-----------|--------|
| CN | 116842073 | 10/2023 |

OTHER PUBLICATIONS

Das, A., Svendsen, M. & Tirthapura, S., "Incremental maintenance of maximal cliques in a dynamic graph," The VLDB Journal, vol. 28, pp. 351-375, 2019 (Year: 2019).*

* cited by examiner

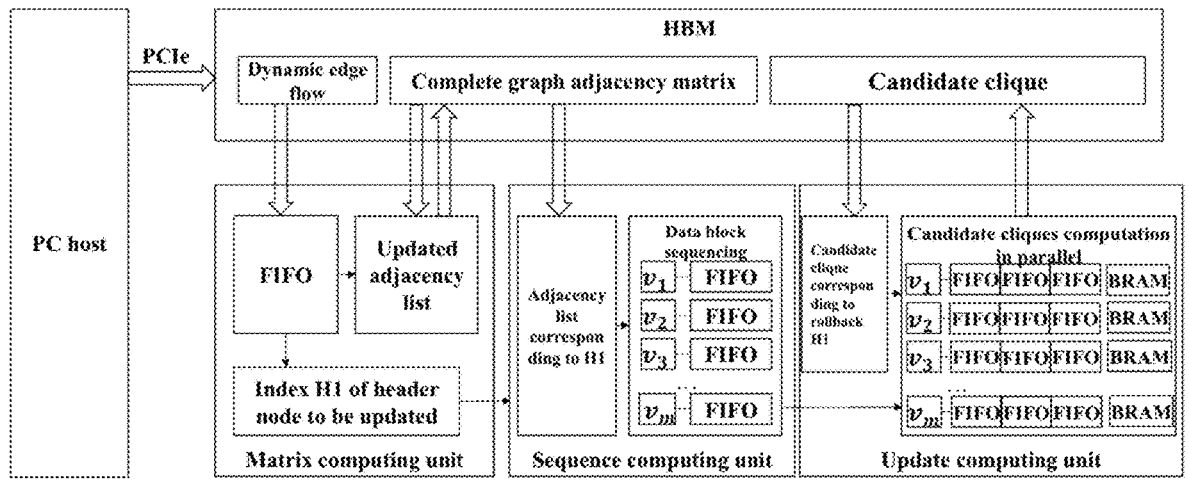

FIG. 1

Obtaining a dynamic edge flow transmitted from an external PC host and used for updating a graph structure, storing the dynamic edge flow in an HBM, wherein the HBM further stores a complete graph adjacency matrix and candidate cliques Using a matrix computing unit to update the complete graph adjacency matrix based on the dynamic edge flow, transmitting the updated complete graph adjacency matrix to the HBM for storage, and determining corresponding header nodes of the candidate cliques that need to be updated Using a sequence computing unit, the sorted data set for reconstructing candidate cliques is constructed by data block sequencing according to the updated adjacency matrix of the complete graph and each header node to be updated Using an update computing unit to execute, in parallel, an update task of the candidate cliques corresponding to each header node to be updated based on the sorted data set, and transmitting the updated candidate cliques to the HBM for storage Transmitting updated candidate clique result data to a PC host, and extracting, by the PC host, maximal cliques by means of a candidate clique filtering operation

FIG. 2

$G_0$ at time $t_0$    $G_1$ at time $t_1$

| Small neighbor node | Header node | Large neighbor node |
|---|---|---|
|  | 1 | 2 5 |
| 1 | 2 | 3 4 5 6 7 |
| 2 | 3 | 4 6 |
| 2 3 | 4 | 5 6 |
| 1 2 4 | 5 | 6 |
| 2 3 4 5 | 6 | 7 |
| 2 6 | 7 |  |

| Small neighbor node | Header node | Large neighbor node |
|---|---|---|
|  | 1 | 2 5 |
| 1 | 2 | 4 5 6 7 |
|  | 3 | 4 5 6 |
| 2 3 | 4 | 5 6 |
| 1 2 3 4 | 5 | 6 |
| 2 3 4 5 | 6 | 7 |
| 2 6 | 7 |  |

Candidate maximal clique of G0:

$v_1 - v_2 \; v_5$
$v_2 \begin{cases} v_3 \; v_4 \; v_6 \\ v_4 \; v_5 \; v_6 \\ v_6 \; v_7 \end{cases}$
$v_3 - v_4 \; v_6$
$v_4 - v_5 \; v_6$
$v_5 - v_6$
$v_6 - v_7$ Candidate maximal clique of G1:

$v_1 - v_2 \; v_5$
$v_2 \begin{cases} v_4 \; v_5 \; v_6 \\ v_6 \; v_7 \end{cases}$
$v_3 - v_4 \; v_5 \; v_6$
$v_4 - v_5 \; v_6$
$v_5 - v_6$
$v_6 - v_7$

| Header node | $FIFO_A$ | $FIFO_B$ | $FIFO_C$ | BRAM | | | |
|---|---|---|---|---|---|---|---|
| (1) $v_2$ | $\emptyset$-$v_4$<br>$\{v_4\}$-$v_5$<br>$\{v_4,v_5\}$-$v_6$<br>$\{v_6\}$-$v_7$ | $\emptyset$ | Temporary | $cnt_A = 0$ | $cnt_B = 0$ | $cnt_C = 0$ | $\emptyset$ |
| (2) $v_2$ | $\{v_4\}$-$v_5$<br>$\{v_4,v_5\}$-$v_6$<br>$\{v_6\}$-$v_7$ | Temporary | $\{v_4\}$ | $cnt_A = 1$ | $cnt_B = 1$ | $cnt_C = 1$ | $\{v_4\}$ |
| (3) $v_2$ | $\{v_4,v_5\}$-$v_6$<br>$\{v_6\}$-$v_7$ | $\{v_4v_5\}$ | Temporary | $cnt_A = 2$ | $cnt_B = 2$ | $cnt_C = 2$ | $\{v_4,v_5\}$ |
| (4) $v_2$ | $\{v_6\}$-$v_7$ | Temporary | $\{v_4v_5v_6\}$ | $cnt_A = 1$ | $cnt_B = 3$ | $cnt_C = 1$ | $\{v_6\}$ |
| (5) $v_2$ | | $\{v_4v_5v_6\}$<br>$\{v_6v_7\}$ | Temporary | $cnt_A$ | $cnt_B$ | $cnt_C$ | |

FIG. 8

DYNAMIC MAXIMAL CLIQUE ENUMERATION DEVICE AND METHOD BASED ON FPGA WITH HBM

This is a U.S. national stage application of PCT Application No. PCT/CN2023/134667 under 35 U.S.C. 371, filed Nov. 28, 2023 in Chinese, claiming priority of Chinese Application No. 202311465612.3, filed Nov. 7, 2023, all of which are hereby incorporated by reference.

FIELD OF TECHNOLOGY

The present invention belongs to the graph computing technical field of big data processing, and in particular relates to a dynamic maximal clique enumeration device and method based on an Field Programmable Gate Array (FPGA) with an High Bandwidth Memory (HBM).

BACKGROUND TECHNOLOGY

With the advent of the era of big data, graph data has become an important data model for describing and mining associated data, in which a node represents a data unit and an edge represents a relationship between data units. Maximal clique enumeration is a graph computing problem with wide application and significance. For example, by enumerating maximal cliques in a social network graph, we can discover groups with a close relationship or similar interests. Protein complexes and functional modules can be discovered by enumerating maximal cliques in a protein interaction network.

Data of most large graphs in the real world changes dynamically over time, wherein new edges are randomly created or existing ones are broken. But the number of these changed edges is usually small relative to the overall size of the graph data. Therefore, many applications need to adopt an incremental computing method to update a maximal clique result corresponding to a graph structure in real time according to a change of a graph, instead of recomputing a whole maximal clique based on the changed graph structure.

The dynamic graph-based incremental maximal clique enumeration problem requires the algorithm to have high real-time performance and can quickly respond to a pipeline computing task brought by a random data change. An existing incremental maximal clique enumeration method ("Honour thy neighbour—clique maintenance in dynamic graphs") can handle adding/deleting a set of edges simultaneously. An algorithm proposed in the document "Incremental maintenance of maximal cliques in a dynamic graph" can accurately calculate a change of maximal cliques by enumerating new added maximal cliques and vanished maximal cliques. When the addition and deletion of edges mix randomly, the algorithm adopts a pseudo-mixing method, and a final structure is summarized after processing the added edges and deleted edges respectively. The patent document CN114357264A discloses a dynamic maximal clique enumeration method based on SOMEi data structure rollback reconstruction, which simultaneously processes addition and deletion of edges in a unified framework, and realizes a true maximal clique enumeration update of edge mixing changes. None of the above methods can support pipelined incremental maximal clique computation.

With the development of new hardwares such as FPGAs, the incremental computation on the large graph data is still faced with a challenge of further speeding up and increasing efficiency, which requires an algorithm to have good parallelism and makes complete use of performance advantages brought by an increase of hardware resources. The existing work of graph computation based on an FPGA mainly studies a general computing framework which adapts many classical graph operators. At present, there is no work on a custom design of an FPGA hardware and software collaborative algorithm for the incremental maximal clique enumeration problem.

An HBM (High Bandwidth Memory) is a new CPU/GPU memory chip. Multiple DDR chips are stacked together and packaged together with a GPU to achieve a large-capacity, high bit-width DDR combination array, and the HBM and an FPGA are integrated to form an FPGA with the HBM.

SUMMARY OF THE INVENTION

In view of the above, the object of the present invention is to provide a dynamic maximal clique enumeration device and method based on an FPGA with an HBM, which supports pipelined-type incremental maximal clique computation, thereby improving the overall computing efficiency of a task.

For the object of the present invention, provided in an embodiment is a dynamic maximal clique enumeration device based on an FPGA with an HBM, wherein the device comprises the HBM; and a matrix computing unit, a sequence computing unit and an update computing unit which are constructed by means of function isolation and division and algorithmic function division of First-In-First-Outs (FIFOs) of the FPGA;

the HBM is used to store a dynamic edge flow, a complete graph adjacency matrix, and a candidate clique which are transmitted from an external PC host and used for updating a graph structure;

the matrix computing unit is used to update the complete graph adjacency matrix based on the dynamic edge flow, transmit the updated complete graph adjacency matrix to the HBM for storage, and determine header nodes of the candidate cliques that need to be updated;

the sequence computing unit is used to construct, according to the updated complete graph adjacency matrix and each header node to be updated, a sorted data set for reconstructing candidate cliques by data block sequencing; and the update computing unit is used to execute, in parallel, an update task of the candidate clique corresponding to each header node to be updated based on the sorted data set for reconstructing candidate cliques, transmit the updated candidate cliques to the HBM for storage, and transmit the updated candidate cliques to the PC host to extract maximal cliques by means of a filtering operation.

Preferably, the matrix computing unit comprises a first FIFO and is used for updating the complete graph adjacency matrix based on the dynamic edge flow, including:

caching the dynamic edge flow obtained from the HBM in the first FIFO; determining a node to be updated and a neighbor node set of the node to be updated according to the dynamic edge flow; obtaining an old adjacency list of all the nodes to be updated from the complete graph adjacency matrix of the HBM; updating the old adjacency list according to the neighbor node set; and writing the updated adjacency list in the HBM for storage to realize the update of the complete graph adjacency matrix, wherein the neighbor node set comprises a small neighbor node set and a large neighbor node set of the node to be updated.

Preferably, in the matrix computing unit, determining the corresponding header nodes of the candidate cliques that need to be updated comprises:

determining, according to the small neighbor node set of the node to be updated, the header node to be updated which is generated by a current batch of dynamic edge flow and needs to update the candidate clique, and using an index to record a node corresponding to a rollback position of the candidate clique of each header node to be updated.

Preferably, in the sequence computing unit, constructing, according to the updated complete graph adjacency matrix and each header node to be updated, a sorted data set for reconstructing candidate cliques by data block sequencing comprises:

obtaining the updated adjacency list corresponding to each header node to be updated in an index record from the updated complete graph adjacency matrix in the HBM, and computing the large neighbor node set required for updating the candidate clique of each header node to be updated according to the index record and the updated adjacency list; and obtaining small neighbor node sets corresponding to each large neighbor node from the HBM, and intersecting each small neighbor node set with the large neighbor node set respectively, and determining a common neighbor node set of each large neighbor node; and constructing a second FIFO for each header node to be updated, and sequencing the large neighbor node of each header node to be updated and the corresponding common neighbor node set according to node sequence numbers, then storing the sequenced large neighbor node and corresponding common neighbor node set in the second FIFO to form a sorted data set for reconstructing candidate cliques.

Preferably, in the update computing unit, executing, in parallel, an update task of the candidate clique corresponding to each header node to be updated based on the sorted data set for reconstructing candidate cliques, comprises:

establishing one sub-task and three FIFO queues and Block Random Access Memory (BRAM) blocks corresponding to the sub-task for each header node to be updated in the index record, wherein one FIFO queue is used to store the large neighbor node and the common neighbor node set thereof obtained from the sorted data set, and the other two FIFO queues are alternatively a temporary queue and an active queue; the temporary queue stores a candidate clique queue corresponding to the node to be updated, and the active queue stores a candidate clique queue in updating; the BRAM block comprises a node set record block and three length record blocks, wherein the node set record block is used to store an intersection set of the current common neighbor node set and the current candidate clique, and the three length record blocks record the length of the current common neighbor node set, the length of the current candidate clique and the length of the intersection set respectively; and on the basis of a node order corresponding to each header node to be updated obtained from the sorted data set, the sub-tasks corresponding to all the header nodes to be updated use the three FIFO queues and the BRAM blocks to execute, in parallel, the update task of the candidate cliques.

Preferably, the process that each sub-task executes the update of the candidate clique comprises:

obtaining an old candidate clique corresponding to each header node to be updated from the HBM and storing the old candidate clique in the active queue, and obtaining the large neighbor node corresponding to each header node to be updated and the common neighbor node set thereof from the sorted data set and storing the large neighbor node and the common neighbor node set thereof in the first FIFO queue; and sequentially accessing each large neighbor node and the corresponding common neighbor node set in the FIFO queue; using each large neighbor node and the corresponding common neighbor node set to update the old candidate clique in the active queue; transferring the updated large group to the temporary queue for storage; and exchanging marks of the temporary queue and the active queue for the next round of update operation.

Preferably, the update operation process comprises:

if the candidate clique queue in the active queue is null, or the common neighbor node set is null, directly adding the large neighbor node corresponding to the current common neighbor node set to the temporary queue as a candidate clique, and ending the current round of update operation; and if the candidate clique maximal queue in the active queue is not null, then sequentially traversing each candidate clique, and performing a single comparison operation between the common neighbor node set and the candidate clique to update the candidate clique until the candidate clique queue is traversed completely or a traversal stop condition is triggered, wherein during traversal, two sets FSet and PSet are maintained, so as to temporarily store the maximal cliques that requires further filtering.

Preferably, the single comparison operation comprises:

storing the common neighbor node set in the BRAM, treating the node as a BRAM address, counting by determining whether the value of the BRAM is 1, storing the length count of the common neighbor node set in a first length record block $cnt_A$, taking out the current candidate clique as a read address of the BRAM, counting by determining whether the value of the BRAM is 1, storing the length count thereof in a second length record block $cnt_B$, storing the intersection set of the common neighbor node set and the candidate clique in a node set record block IList, recording and storing the length of the node set record block in a third length record block $cnt_C$, comparing the values in the three length record blocks, and performing operations according to the following four cases:

when $cnt_A=cnt_B=cnt_C$, that is, if the two sets, the common neighbor node set and the candidate clique set, are equal, then writing the large neighbor node in the temporary queue after the large neighbor node is added to the candidate clique set, reading out other candidate cliques in the active queue and writing the other candidate cliques in the temporary queue, and triggering the traversal stop condition;

when $cnt_C=cnt_A<cnt_B$, that is, if the common neighbor node set is a proper subset of the candidate clique set, then writing the candidate clique set in the temporary queue, writing the large neighbor node in the temporary queue after the large neighbor node is added to the common neighbor node set, reading out other candidate cliques in the active queue and writing the other candidate cliques in the temporary queue, and triggering the traversal stop condition;

when $cnt_C = cnt_B < cnt_A$, that is, if the candidate clique set is a proper subset of the common neighbor node set, then writing the large neighbor node in the temporary queue after the large neighbor node is added to the candidate clique set, and storing the ILIST in the set Fset; and when $cnt_B \neq 0$ and $cnt_B < cnt_C$, and $cnt_B < cnt_A$, that is, if the candidate clique set and the common neighbor node set are not inclusive with each other, and the intersection set is not null, then writing the candidate clique set in the temporary queue, and storing the IList in the set PSet.

Preferably, the update computing unit further comprises:

when the candidate clique queue is traversed completely and the traversal stop condition is not triggered, then filtering the candidate cliques in the set FSet and the set Pset, which is specifically as follows: traversing each candidate clique in the PSet; and if the traversed candidate clique is neither a proper subset of any other candidate clique in the PSet, nor a proper subset of any candidate clique in the FSet, then writing the traversed candidate clique in the temporary queue after the traversed candidate clique is added to the large neighbor node.

For the purpose of the present invention, also provided in an embodiment is a dynamic maximal clique enumeration method based on an FPGA with an HBM, using the above dynamic maximal clique enumeration device, and comprising the following steps:

obtaining a dynamic edge flow transmitted from the external PC host and used for updating a graph structure, storing the dynamic edge flow in the HBM, wherein the HBM further stores a complete graph adjacency matrix and candidate cliques;

using a matrix computing unit to update the complete graph adjacency matrix based on the dynamic edge flow, transmitting the updated complete graph adjacency matrix to the HBM for storage, and determining corresponding header nodes of the candidate cliques that need to be updated;

using a sequence computing unit to construct, according to the updated complete graph adjacency matrix and each header node to be updated, a sorted data set for reconstructing candidate cliques by data block sequencing; and using an update computing unit to execute, in parallel, an update task of the candidate clique corresponding to each header node to be updated based on the sorted data set for reconstructing candidate cliques, and transmitting the updated candidate cliques to the HBM for storage; and transmitting updated candidate clique result data to the PC host, and extracting, by the PC host, maximal cliques by means of a candidate clique filtering operation.

Compared with the prior art, the present invention has at least the following beneficial effects:

Aiming at the incremental maximal clique enumeration problem of large-scale dynamic graph data, the matrix computing unit, the sequence computing unit and the update computing unit connected in series are designed based on the pipeline parallel architecture computing model of FPGA, which can quickly respond to several batches of dynamic edge flows transmitted by a client at different times, and perform multi-batch pipeline processing, and greatly reduces the computing delay of incremental maximal clique enumeration task.

Moreover, in the sequence computing unit and the update computing unit, the update task is segmented and isolated according to the header node to be updated, which supports parallel computation of multiple sub-tasks with extremely high concurrency and improves the overall computing speed of the task.

BRIEF DESCRIPTION OF THE DRAWINGS

In order to more clearly state the technical solutions in the embodiments of the present invention or in prior art, the following is a brief introduction to the attached drawings required to be used in the description of the embodiments or the prior art. It is obvious that the drawings in the description below are only some embodiments of the present invention. For a person skilled in the art, other drawings can also be obtained according to these drawings without creative labor.

FIG. 1 is a schematic structure diagram of a dynamic maximal clique enumeration device based on an FPGA with an HBM provided by an embodiment;

FIG. 2 is a flow chart of a dynamic maximal clique enumeration method based on an FPGA with an HBM provided by an embodiment;

FIG. 8 is a computation process of a sub-task in the parallel computation in the example.

DESCRIPTION OF THE EMBODIMENTS

Figures 3, 4, 5:
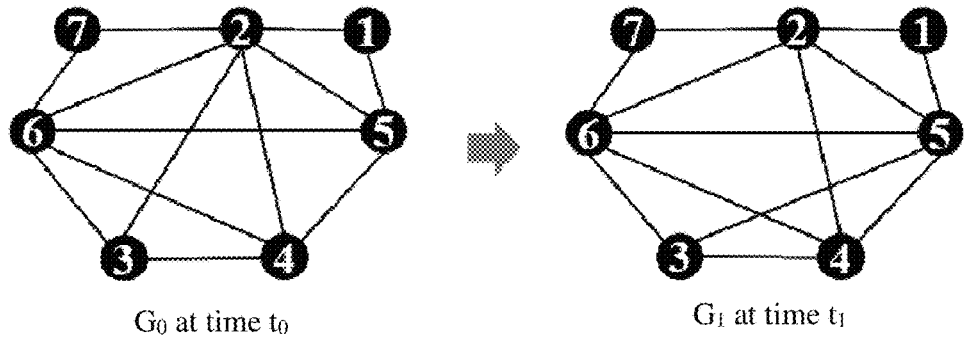
FIG. 3 is an example of a dynamic maximal clique enumeration parallel computing task, wherein a data structure of a dynamic graph G changes from time $t_0$ to time $t_1$.
FIG. 4 is an example diagram of a change in an adjacency list of the dynamic graph in the example.
FIG. 5 is an example diagram of changes in candidate cliques in the example.

In order to make the object, technical solutions and advantages of the present invention more clearly understood, the present invention is further described in detail in combination with the attached drawings and embodiments. It should be understood that the specific implementations described herein are intended only to explain the present invention and do not limit the protection scope of the present invention.

As shown in FIG. 1, an embodiment provides a dynamic maximal clique enumeration device based on an FPGA with an HBM, comprising the HBM, a matrix computing unit, a sequence computing unit and an update computing unit, wherein, the matrix computing unit, the sequence computing unit and the update computing unit are determined by function partitioning in combination with an inherent hardware function of the FPGA, such as FIFOs, and an algorithm designed to achieve dynamic maximal clique enumeration. In each unit, the functions of FIFOs are separated. These three units support pipelined-type incremental maximal clique computation together with the HBM, thereby improving the overall computing efficiency of the task.

The HBM is used to store a dynamic edge flow, a complete graph adjacency matrix, and a candidate clique which are transmitted from an external PC host and used for updating a graph structure; the matrix computing unit is used to update a complete graph adjacency matrix of global graph data based on the dynamic edge flow, transmit the updated complete graph adjacency matrix to the HBM for storage, and determines corresponding header nodes of the candidate cliques that need to be updated; the sequence computing unit is used to construct, according to the updated complete graph adjacency matrix and each header node to be updated, a sorted data set for reconstructing candidate cliques by data block sequencing; and the update computing unit is used to execute, in parallel, an update task of the candidate clique corresponding to each header node to be updated based on the sorted data set for reconstructing candidate cliques, and transmit the updated candidate cliques to the HBM for storage.

Based on the dynamic maximal clique enumeration device, also provided in an embodiment is a dynamic maximal clique enumeration method, as shown in FIG. 2, comprising the following steps:

step 1, obtaining a dynamic edge flow transmitted from the external PC host and used for updating a graph structure, storing the dynamic edge flow in the HBM, wherein the HBM further stores a complete graph adjacency matrix and candidate cliques;

step 2, using a matrix computing unit to update the complete graph adjacency matrix based on the dynamic edge flow, transmitting the updated complete graph adjacency matrix to the HBM for storage, and determining corresponding header nodes of the candidate cliques that need to be updated;

step 3, using a sequence computing unit to construct, according to the updated complete graph adjacency matrix and each header node to be updated, a sorted data set for reconstructing candidate cliques by data block sequencing; and step 4, using an update computing unit to execute, in parallel, an update task of the candidate clique corresponding to each header node to be updated based on the sorted data set for reconstructing candidate cliques, and transmitting the updated candidate cliques to the HBM for storage; and step 5, transmitting updated candidate clique result data to the PC host, and extracting, by the PC host, maximal cliques by means of a candidate clique filtering operation.

The following is a detailed description of the dynamic maximal clique enumeration device and each unit in the dynamic maximal clique enumeration method.

During dynamic maximal clique enumeration, a batch of dynamic edge flows are received from the PC host through a PCIe main line of the FPGA and stored in the HBM, wherein the number of dynamic edges is N.

In the embodiment, the matrix computing unit updates the complete graph adjacency matrix in the HBM based on the received dynamic edge flows. Specifically, the matrix computing unit comprises a first FIFO, the dynamic edge flow obtained from the HBM is cached in the first FIFO, and a node to be updated and a neighbor node set of the node to be updated are determined according to the dynamic edge flows. Each dynamic edge is $e^{+/-}(v_i,v_j)$ where, $v_i$ and $v_j$ are all nodes to be updated, $e^+(v_i,v_j)$ indicates that an edge is added between $v_i$ and $v_j$, and $e^-(v_i,v_j)$ indicates that an edge between $v_i$ and $v_j$ is deleted. The neighbor node set of the node to be updated comprises a small neighbor node set and a large neighbor node set of the node to be updated. If i<j, $v_j$ is recorded in the large neighbor node set of node $v_i$ to be updated, and $v_i$ is recorded in the small neighbor node set of the node $v_j$ to be updated. An old adjacency list of all the nodes to be updated is obtained from the complete graph adjacency matrix of the HBM; the old adjacency list is updated according to the neighbor node set; and the updated adjacency list is written into the HBM for storage to realize the update of the complete graph adjacency matrix.

When updating the graph adjacency matrix, the matrix computing unit also needs to determine corresponding header nodes of the candidate cliques that need to be updated, the process is as follows: determining, according to the small neighbor node set of the node to be updated, the header node to be updated of which the candidate clique needs to be updated and which is generated by a current batch of dynamic edge flow, and recording a node $v_y$ corresponding to a rollback position of each candidate clique of each header node $v_x$ to be updated by an index. This process is detailed in the patent application with a publication number of CN114357264A.

In the embodiment, the sequence computing unit constructs, according to the updated complete graph adjacency matrix and each header node to be updated, a sorted data set for reconstructing candidate cliques by data block sequencing, of which a specific process comprises:

obtaining the updated adjacency list corresponding to each header node $v_x$ to be updated in an index H1 record from the updated complete graph adjacency matrix in the HBM, and computing the large neighbor node set $\{v_y, \ldots, v_{max}\}$ required for updating the candidate clique of each header node $v_x$ to be updated according to the index record and the updated adjacency list, wherein $v_{max}$ is a largest neighbor node of $v_x$; $v_y$ is a node $v_y$ corresponding to a rollback position of a candidate clique of each header node $v_x$ to be updated, and nodes in the large neighbor node set $\{v_y, \ldots, v_{max}\}$ are listed in sequence according to subscript sequence numbers;

obtaining small neighbor node sets corresponding to each large neighbor node $v_y, \ldots, v_{max}$ from the HBM, and intersecting each small neighbor node set with the large neighbor node set respectively, and determining a common neighbor node set of each large neighbor node $v_y, \ldots, v_{max}$ and the header node $v_x$ to be updated; and constructing a second FIFO for each header node $v_x$ to be updated, and sequencing the large neighbor nodes $v_y, \ldots v_{max}$ of each header node to be updated and the corresponding common neighbor node set according to node sequence numbers, then storing the sequenced large neighbor nodes and corresponding common neighbor node sets in the second FIFO to form a sorted data set for reconstructing candidate cliques.

In the embodiment, the update computing unit executes, in parallel, an update task of the candidate clique corresponding to each header node to be updated based on the sorted data set for reconstructing candidate cliques, of which a specific process comprises:

establishing one sub-task and three FIFO queues and BRAM blocks corresponding to the sub-task for each header node to be updated in the index record, wherein one FIFO queue $FIFO_A$ is used to store the large neighbor node and the common neighbor node set thereof obtained from the sorted data set, and the other two FIFO queues $FIFO_B$ and $FIFO_C$ are alternatively a temporary queue and an active queue; the temporary queue stores a candidate clique queue corresponding to the node to be updated, and the active queue stores a candidate clique queue in the update; and if the updated candidate clique queue is stored in $FIFO_B$, $FIFO_B$ is an active queue, $FIFO_C$ is a temporary queue, and vice versa;

the BRAM block comprises a node set record block and three length record blocks $cnt_A$, $cnt_B$ and $cnt_C$, wherein the node set record block is used to store an intersection set of the current common neighbor node set and the current candidate clique, and $cnt_A$, $cnt_B$ and $cnt_C$ record the length of the current common neighbor node set, the length of the current candidate clique and the length of the intersection set respectively; and on the basis of a node order corresponding to each header node to be updated obtained from the sorted data set, the sub-tasks corresponding to all the header nodes to be updated use the three FIFO queues and the BRAM blocks to execute, in parallel, the update task of the candidate cliques.

Specifically, the process that each sub-task executes the update of the candidate clique comprises:

obtaining an old candidate clique corresponding to each header node to be updated from the HBM and storing the old candidate clique in the active queue, and obtaining the large neighbor node corresponding to each header node to be updated and the common neighbor node set thereof from the sorted data set and storing the large neighbor node and the common neighbor node set thereof in the first FIFO queue $FIFO_A$; and sequentially accessing each large neighbor node and the corresponding common neighbor node set in the FIFO queue $FIFO_A$; using each large neighbor node and the corresponding common neighbor node set to update the old candidate clique in the active queue; transferring the updated large group to the temporary queue for storage; and exchanging marks of the temporary queue and the active queue for the next round of update operation.

More specifically, the updating operation process in the update process comprises:

if the candidate clique queue in the active queue is null, or the common neighbor node set is null, directly adding the large neighbor node corresponding to the current common neighbor node set to the temporary queue as a candidate clique, and ending the current round of update operation; and if the candidate clique maximal queue in the active queue is not null, then sequentially traversing each candidate clique, and performing a single comparison operation between the common neighbor node set and the candidate clique to update the candidate clique until the candidate clique queue is traversed completely or a traversal stop condition is triggered, wherein during traversal, two sets FSet and PSet are maintained, so as to temporarily store the maximal cliques that requires further filtering.

More specifically, the single comparison operation in the update operation process comprises:

storing the common neighbor node set in the BRAM, treating the node as a BRAM address, counting by determining whether the value of the BRAM is 1, storing the length count of the common neighbor node set in a first length record block $cnt_A$, taking out the current candidate clique as a read address of the BRAM, counting by determining whether the value of the BRAM is 1, storing the length count thereof in a second length record block $cnt_B$, storing the intersection set of the common neighbor node set and the candidate clique in a node set record block IList, recording and storing the length of the node set record block in a third length record block $cnt_C$, comparing the values in $cnt_A$, $cnt_B$ and $cnt_C$, and performing operations according to the following four cases:

when $cnt_A = cnt_B = cnt_C$, that is, if the two sets, the common neighbor node set and the candidate clique set, are equal, then writing the large neighbor node in the temporary queue after the large neighbor node is added to the candidate clique set, reading out other candidate cliques in the active queue and writing the other candidate cliques in the temporary queue, and triggering the traversal stop condition;

when $cnt_C = cnt_A < cnt_B$, that is, if the common neighbor node set is a proper subset of the candidate clique set, then writing the candidate clique set in the temporary queue, writing the large neighbor node in the temporary queue after the large neighbor node is added to the common neighbor node set, reading out other candidate cliques in the active queue and writing the other candidate cliques in the temporary queue, and triggering the traversal stop condition;

when $cnt_C = cnt_B < cnt_A$, that is, if the candidate clique set is a proper subset of the common neighbor node set, then writing the large neighbor node in the temporary queue after the large neighbor node is added to the candidate clique set, and storing the ILIST in the set Fset; and when $cnt_B \neq 0$ and $cnt_B < cnt_C$ and $cnt_B < cnt_A$, that is, if the candidate clique set and the common neighbor node set are not inclusive with each other, and the intersection set is not null, then writing the candidate clique set in the temporary queue, and storing the IList in the set PSet.

During the update operation process, when the candidate clique queue is traversed completely and the traversal stop condition is not triggered, then filtering the candidate cliques in the set FSet and the set Pset, which is specifically as follows: traversing each candidate clique in the PSet; and if the traversed candidate clique is neither a proper subset of any other candidate clique in the PSet, nor a proper subset of any candidate clique in the FSet, then writing the traversed candidate clique in the temporary queue after the traversed candidate clique is added to the large neighbor node.

Figure 6:
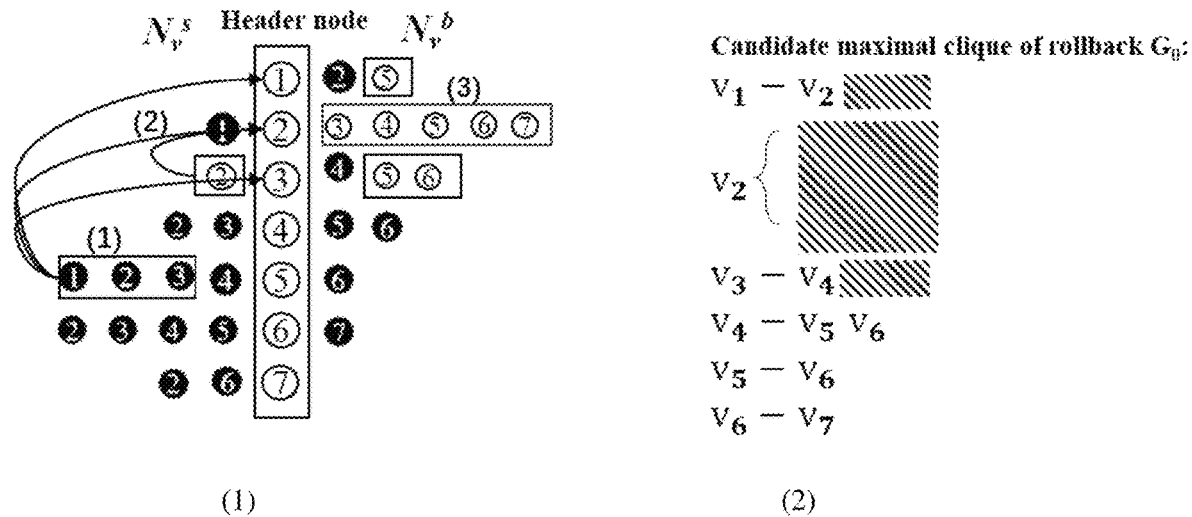
FIG. 6 is an example diagram of a range of header nodes and rollback positions corresponding to the candidate cliques to be updated in the example.
Figure 7:
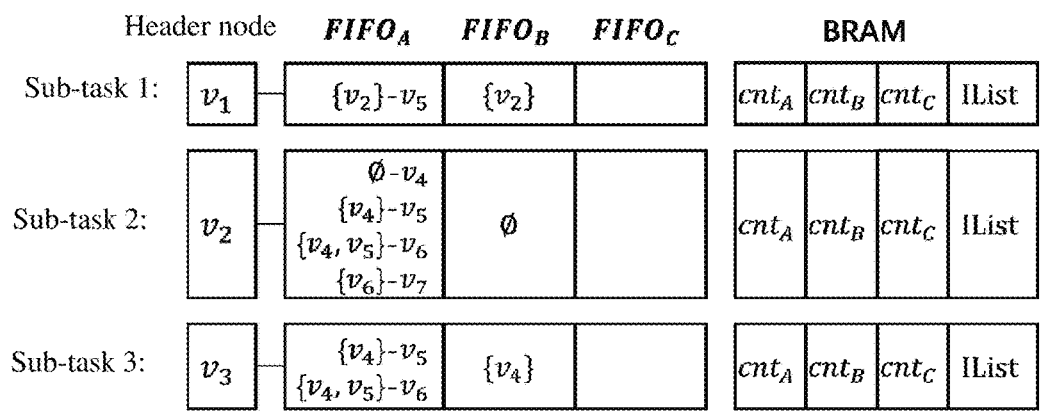
FIG. 7 is an example diagram of the data structure of the parallel computing task in the example.

The following takes the dynamic maximal clique enumeration computation task given in FIG. 3 as an example to illustrate the computation process of the present invention in detail. FIG. 3 shows a dynamically changing undirected graph G=(V, E). A change from time $t_0$ to time $t_1$ is: an edge is added between $v_3$ and $v_5$, and an edge between $v_2$ and $v_3$ is reduced, that is, the dynamic edge flow received from $G_0$ to $G_1$ is $\{e^+(v_3, v_5), e^-(v_2, v_3)\}$. FIG. 4 and FIG. 5 show a change of a corresponding adjacency list and candidate cliques from $G_0$ to $G_1$, respectively. A specific process comprises:

1. receiving 2 dynamic edge flows $\{e^+(v_3, v_5), e^-(v_2, v_3)\}$ from the PC host and store them in the HBM;
2. taking out, by the matrix computing unit, an old adjacency list corresponding to $v_2$, $v_3$, $v_5$ from the HBM, that is, an old large/small neighbor node set, and updating the large/small neighbor node set $N_v^b$ and $N_v^s$ and writing them back to the HBM after computation, wherein as shown in FIG. 6 (1), a header node to be updated is determined as $\{v_2\}$ from the changes of small neighbor nodes of $v_3$, and header nodes to be updated are determined as $\{v_1, v_2, v_3\}$ from the changes of small neighbor nodes of $v_5$. After merging, header nodes to be updated are $\{v_1, v_2, v_3\}$; accordingly, a rollback position of candidate cliques of the header node $v_1$ is $v_5$, a rollback position of the candidate cliques of the header node $v_2$ is $v_3$, and a rollback position of the candidate cliques of the header node $v_3$ is $v_5$; the rollback positions are recorded in index H1, i.e. H1={$v_1$:$v_5$, $v_2$:$v_3$, $v_3$:$v_5$};

3. according to H1 index record, determining that there are three header nodes $v_1$, $v_2$, $v_3$ to be updated; as updating the candidate cliques corresponding to $v_1$ requires a large neighbor node $v_5$, taking out a small neighbor node set of $v_5$, computing a common neighbor node set of $v_1$ and $v_5$ as {$v_2$}, constructing an FIFO for $v_1$, writing {$v_2$}–$v_5$;

as updating the candidate cliques corresponding to $v_2$ requires a large neighbor nodes $v_4$, $v_5$, $v_6$, $v_7$, taking out a small neighbor node set of $v_4$, $v_5$, $v_6$, $v_7$, computing a common neighbor node set of $v_2$ and $v_4$ as null, computing a common neighbor node set of $v_2$ and $v_5$ as {$v_4$}, computing a common neighbor node set of $v_2$ and $v_6$ as {$v_4$, $v_5$}, computing a common neighbor node set of $v_2$ and $v_7$ as {$v_6$}, constructing an FIFO for $v_2$, writing $\varnothing$–$v_4$,{$v_4$}–$v_5$,{$v_4$,$v_5$}–$v_6$,{$v_6$}–$v_7$ in turn;

as updating the candidate cliques corresponding to $v_3$ requires large neighbor nodes $v_5$,$v_6$, taking out a small neighbor node set of $v_5$,$v_6$, computing a common neighbor node set of $v_3$ and $v_5$ as {$v_4$}, computing a common neighbor node set of $v_3$ and $v_6$ as {$v_4$,$v_5$}, constructing an FIFO for $v_3$, writing {$v_4$}–$v_5$,{$v_4$,$v_5$}–$v_6$ in turn;

4. establishing three sub-tasks corresponding to header nodes $v_1$, $v_2$, $v_3$ to be updated, constructing three FIFO queues for each sub-task, and creating a corresponding BRAM block; taking out candidate cliques from the HBM and rolling back the corresponding candidate cliques according to the H1 index record; FIG. 6 (2) shows a result after candidate cliques corresponding to $v_1$, $v_2$, $v_3$ are rolled back; FIG. 7 shows states of FIFOs and BRAM before the execution of the three sub-tasks;

taking sub-task 2 as an example to illustrate the computation process of candidate clique update; FIG. 8 (1) shows an initial state, traversing a common neighbor node set of FIFO$_A$; taking a common neighbor set $\varnothing$ of the first large neighbor node $v_4$ and writing directly {$v_4$} to the temporary queue as the candidate clique if the candidate clique set in FIFO$_B$ is null; exchanging the temporary queue and the active queue;

taking a common neighbor set {$v_4$} of the second large neighbor node $v_5$; writing {$v_4$,$v_5$} to the temporary queue as the candidate clique if the candidate clique set in FIFO$_C$ is {$v_4$}, Ilist={$v_4$} after computation, $cnt_A$=$cnt_B$=$cnt_C$=1; triggering the traversal stop condition;

taking a common neighbor set {$v_4$, $v_5$} of the third large neighbor node $v_6$; writing {$v_4$, $v_5$, $v_6$} to the temporary queue as the candidate clique if the candidate clique set in FIFO$_B$ is {$v_4$, $v_5$}, IList={$v_4$, $v_5$} after computation, $cnt_A$=$cnt_B$=$cnt_C$=2; triggering the traversal stop condition;

taking a common neighbor set {$v_6$} of the fourth large neighbor node $v_7$; writing {$v_4$, $v_5$, $v_6$} and {$v_6$, $v_7$} to the temporary queue as the candidate clique if the candidate clique set in FIFO$_C$ is {$v_4$, $v_5$, $v_6$}, IList={$v_6$} after computation, $cnt_C$=$cnt_A$<$cnt_B$; triggering the traversal stop condition, wherein at this time, the traversal of FIFO$_A$ is completed and the computation of sub-task 2 is completed;

5. writing the updated candidate clique results calculated by the 3 sub-tasks back to the HBM; and 6. transmitting the updated candidate clique result data to the PC host, and extracting, by the PC host, maximal cliques by means of a candidate clique filtering operation.

The above embodiments describe in detail the technical solutions and beneficial effects of the present invention. It should be understood that the above embodiments are only the most preferred embodiments of the present invention and are not used to limit the present invention. Any modification, supplement and equivalent replacement made within the scope of the principle of the present invention shall be included within the protection scope of the present invention.

What is claimed is:

1. A dynamic maximal clique enumeration device based on an Field Programmable Gate Array (FPGA) with an High Bandwidth Memory (HBM), wherein the device comprises the FPGA with the HBM; and a matrix computing unit, a sequence computing unit and an update computing unit which are constructed by means of function isolation and division and algorithm function division of First-In-First-Outs (FIFOs) of the FPGA;

the HBM is used to store a dynamic edge flow, a complete graph adjacency matrix, and a candidate clique which are transmitted from an external PC host and used for updating a graph structure, wherein the dynamic edge flow is a data flow formed by dynamic edges, each dynamic edge is $e^{+/-}(v_i, v_j)$, where, $v_i$ and $v_j$ are all nodes to be updated, $e^+(v_i, v_j)$ indicates that an edge is added between $v_i$ and $v_j$, and $e^-(v_i, v_j)$ indicates that an edge between $v_i$ and $v_j$ is deleted;

the matrix computing unit is used to update the complete graph adjacency matrix based on the dynamic edge flow, transmit the updated complete graph adjacency matrix to the HBM for storage, and determine a header node to be updated that needs to update the candidate clique;

the sequence computing unit is used to construct, according to the updated complete graph adjacency matrix and each header node to be updated, a sorted data set for reconstructing candidate cliques by data block sequencing; and the update computing unit is used to execute, in parallel, an update task of the candidate clique corresponding to each header node to be updated based on the sorted data set for reconstructing candidate cliques, transmit the updated candidate cliques to the HBM for storage, and transmit the updated candidate cliques to the PC host to extract maximal cliques by means of a filtering operation.

2. The dynamic maximal clique enumeration device based on an FPGA with an HBM according to claim 1, wherein the matrix computing unit comprises a first FIFO and is used for updating the complete graph adjacency matrix based on the dynamic edge flow, comprising:

caching the dynamic edge flow obtained from the HBM in the first FIFO; determining a node to be updated and a neighbor node set of the node to be updated according to the dynamic edge flow; obtaining an old adjacency list of all the nodes to be updated from the complete graph adjacency matrix of the HBM; updating the old adjacency list according to the neighbor node set; and writing the updated adjacency list in the HBM for storage to realize the update of the complete graph adjacency matrix, wherein the neighbor node set comprises a small neighbor node set and a large neighbor node set of the node to be updated.

3. The dynamic maximal clique enumeration device based on an FPGA with an HBM according to claim 2, wherein in the matrix computing unit, determining the header node to be updated that needs to update the candidate clique comprises:

determining, according to the small neighbor node set of the node to be updated, the header node to be updated which is generated by a current batch of dynamic edge flow and needs to update the candidate clique, and using an index to record a node corresponding to a rollback position of the candidate clique of each header node to be updated.

4. The dynamic maximal clique enumeration device based on an FPGA with an HBM according to claim 3, wherein the sequence computing unit comprises a plurality of second FIFOs, and wherein constructing, according to the updated complete graph adjacency matrix and each header node to be updated, a sorted data set for reconstructing candidate cliques by data block sequencing, comprises:

obtaining the updated adjacency list corresponding to each header node to be updated in an index record from the updated complete graph adjacency matrix in the HBM, and computing the large neighbor node set required for updating the candidate clique of each header node to be updated according to the index record and the updated adjacency list; and obtaining small neighbor node sets corresponding to each large neighbor node from the HBM, and intersecting each small neighbor node set with the large neighbor node set respectively, and determining a common neighbor node set of each large neighbor node; and constructing a second FIFO of the plurality of second FIFOs for each header node to be updated, and sequencing the large neighbor node of each header node to be updated and the corresponding common neighbor node set according to node sequence numbers, then storing the sequenced large neighbor node and corresponding common neighbor node set in the second FIFO to form a sorted data set for reconstructing candidate cliques.

5. The dynamic maximal clique enumeration device based on an FPGA with an HBM according to claim 3, wherein the update computing unit comprises a plurality of third FIFOs and a plurality of Block Random Access Memory (BRAM) blocks, and wherein executing, in parallel, an update task of the candidate clique corresponding to each header node to be updated based on the sorted data set for reconstructing candidate cliques, comprises:

establishing one sub-task and three FIFO queues of the plurality of third FIFOs and BRAM blocks corresponding to the sub-task for each header node to be updated in the index record, wherein one FIFO queue is used to store the large neighbor node and the common neighbor node set thereof obtained from the sorted data set, and the other two FIFO queues are alternatively a temporary queue and an active queue; the temporary queue stores a candidate clique queue corresponding to the node to be updated, and the active queue stores a candidate clique queue in updating; the BRAM block comprises a node set record block and three length record blocks, wherein the node set record block is used to store an intersection set of the current common neighbor node set and the current candidate clique, and the three length record blocks record the length of the current common neighbor node set, the length of the current candidate clique and the length of the intersection set respectively; and on the basis of a node order corresponding to each header node to be updated obtained from the sorted data set, the sub-tasks corresponding to all the header nodes to be updated use the three FIFO queues and the BRAM blocks to execute, in parallel, the update task of the candidate cliques.

6. The dynamic maximal clique enumeration device based on an FPGA with an HBM according to claim 5, wherein the process that each sub-task executes the update of the candidate clique comprises:

obtaining an old candidate clique corresponding to each header node to be updated from the HBM and storing the old candidate clique in the active queue, and obtaining the large neighbor node corresponding to each header node to be updated and the common neighbor node set thereof from the sorted data set and storing the large neighbor node and the common neighbor node set thereof in the first FIFO queue; and sequentially accessing each large neighbor node and the corresponding common neighbor node set in the FIFO queue; using each large neighbor node and the corresponding common neighbor node set to update the old candidate clique in the active queue; transferring the updated large group to the temporary queue for storage; and exchanging marks of the temporary queue and the active queue for the next round of update operation.

7. The dynamic maximal clique enumeration device based on an FPGA with an HBM according to claim 6, wherein the update operation process comprises:

if the candidate clique queue in the active queue is null, or the common neighbor node set is null, directly adding the large neighbor node corresponding to the current common neighbor node set to the temporary queue as a candidate clique, and ending the current round of update operation; and if the candidate clique maximal queue in the active queue is not null, then sequentially traversing each candidate clique, and performing a single comparison operation between the common neighbor node set and the candidate clique to update the candidate clique until the candidate clique queue is traversed completely or a traversal stop condition is triggered, wherein during traversal, two sets FSet and PSet are maintained, so as to temporarily store the maximal cliques that requires further filtering.

8. The dynamic maximal clique enumeration device based on an FPGA with an HBM according to claim 7, wherein the single comparison operation comprises:

storing the common neighbor node set in the BRAM, treating the node as a BRAM address, counting by determining whether the value of the BRAM is 1, storing the length count of the common neighbor node set in a first length record block $cnt_A$, taking out the current candidate clique as a read address of the BRAM, counting by determining whether the value of the BRAM is 1, storing the length count thereof in a second length record block $cnt_B$, storing the intersection set of the common neighbor node set and the candidate clique in a node set record block IList, recording and storing the length of the node set record block in a third length record block $cnt_C$, comparing the values in the three length record blocks, and performing operations according to the following four cases:

when $cnt_A = cnt_B = cnt_C$, that is, if the two sets, the common neighbor node set and the candidate clique set, are equal, then writing the large neighbor node in the temporary queue after the large neighbor node is added to the candidate clique set, reading out other candidate cliques in the active queue and writing the other candidate cliques in the temporary queue, and triggering the traversal stop condition;

when $cnt_C - cnt_A < cnt_B$, that is, if the common neighbor node set is a proper subset of the candidate clique set, then writing the candidate clique set in the temporary queue, writing the large neighbor node in the temporary queue after the large neighbor node is added to the common neighbor node set, reading out other candidate cliques in the active queue and writing the other candidate cliques in the temporary queue, and triggering the traversal stop condition;

when $cnt_C = cnt_B < cnt_A$, that is, if the candidate clique set is a proper subset of the common neighbor node set, then writing the large neighbor node in the temporary queue after the large neighbor node is added to the candidate clique set, and storing the ILIST in the set Fset; and when $cnt_B \neq 0$ and $cnt_B < cnt_C$ and $cnt_B < cnt_A$ that is, if the candidate clique set and the common neighbor node set are not inclusive with each other, and the intersection set is not null, then writing the candidate clique set in the temporary queue, and storing the IList in the set PSet.

9. The dynamic maximal clique enumeration device based on an FPGA with an HBM according to claim 8, further comprising:

when the candidate clique queue is traversed completely and the traversal stop condition is not triggered, then filtering the candidate cliques in the set FSet and the set Pset, which is specifically as follows: traversing each candidate clique in the PSet; and if the traversed candidate clique is neither a proper subset of any other candidate clique in the PSet, nor a proper subset of any candidate clique in the FSet, then writing the traversed candidate clique in the temporary queue after the traversed candidate clique is added to the large neighbor node.

10. A dynamic maximal clique enumeration method based on an FPGA with an HBM, using the dynamic maximal clique enumeration device according to claim 1, and comprising the following steps:

obtaining the dynamic edge flow transmitted from the external PC host and used for updating a graph structure, storing the dynamic edge flow in the HBM, wherein the HBM further stores a complete graph adjacency matrix and candidate cliques, wherein, the dynamic edge flow is a data flow formed by dynamic edges, each dynamic edge is $e^{+/-}(v_i, v_j)$, where, $v_i$ and $v_j$ are all nodes to be updated, $e^+(v_i, v_j)$ indicates that an edge is added between $v_i$ and $v_j$, and $e^-(v_i, v_j)$ indicates that an edge between $v_i$ and $v_j$ is deleted;

using the matrix computing unit to update the complete graph adjacency matrix based on the dynamic edge flow, transmitting the updated complete graph adjacency matrix to the HBM for storage, and determining corresponding header nodes of the candidate cliques that need to be updated;

using the sequence computing unit to construct, according to the updated complete graph adjacency matrix and each header node to be updated, the sorted data set for reconstructing candidate cliques by data block sequencing; and using the update computing unit to execute, in parallel, the update task of the candidate clique corresponding to each header node to be updated based on the sorted data set for reconstructing candidate cliques, and transmitting the updated candidate cliques to the HBM for storage; and transmitting updated candidate clique result data to the PC host, and extracting, by the PC host, maximal cliques by means of a candidate clique filtering operation.

* * * * *